United States Patent [19]

Leigner

[11] Patent Number: 5,092,474
[45] Date of Patent: Mar. 3, 1992

[54] PLASTIC JAR

[75] Inventor: Frank P. Leigner, Northbrook, Ill.

[73] Assignee: Kraft General Foods, Inc., Glenview, Ill.

[21] Appl. No.: 561,158

[22] Filed: Aug. 1, 1990

[51] Int. Cl.[5] .......................... B65D 1/10; B65D 1/40; B65D 23/00

[52] U.S. Cl. .................................. 215/1 C; 220/666; 220/675

[58] Field of Search ...................... 215/1 R, 1 C, 6, 31, 215/100 A, 321; 220/DIG. 13, 666, 669, 675; D9/408

[56] References Cited

U.S. PATENT DOCUMENTS

| | | | |
|---|---|---|---|
| D. 129,158 | 8/1941 | Dexter | D9/408 X |
| D. 236,688 | 9/1975 | McCaleb | D9/408 |
| 3,536,223 | 10/1970 | Muhlhoff et al. | 215/1 C |
| 3,537,498 | 11/1970 | St. Amand | 215/100 A X |
| 3,923,178 | 12/1975 | Welker, III | 215/1 C |
| 4,116,350 | 9/1978 | Allasia | 215/31 |
| 4,117,946 | 10/1978 | Kessler | 215/321 |
| 4,387,816 | 6/1983 | Weckman | 215/1 C |
| 4,493,427 | 1/1985 | Woikonsky | 215/31 X |
| 4,724,855 | 2/1988 | Jackson et al. | 215/6 X |
| 4,749,092 | 6/1988 | Sugiura et al. | 215/1 C |
| 4,805,788 | 2/1989 | Akiho | 215/1 C |
| 4,863,046 | 9/1989 | Collette et al. | 215/1 C |
| 4,877,141 | 10/1989 | Hayashi et al. | 215/1 C |
| 4,890,752 | 1/1990 | Ota et al. | 215/1 C |
| 4,946,053 | 8/1990 | Conrad | 215/1 C |

FOREIGN PATENT DOCUMENTS 2218395  11/1989  United Kingdom ............... 215/1 C Primary Examiner—Sue A. Weaver
Attorney, Agent, or Firm—Fitch, Even, Tabin & Flannery

[57] ABSTRACT

A lightweight plastic jar having outwardly convex front end and back walls, each having a relatively large radius of curvature, and a pair of side walls having relatively large planar portions capable of controlled inward deflection to accommodate decreases in the interior volume of the jar. The jar is configured to facilitate dispensing of product while also providing strength, efficient use of space in packing with like containers, and an attractive appearance.

8 Claims, 2 Drawing Sheets

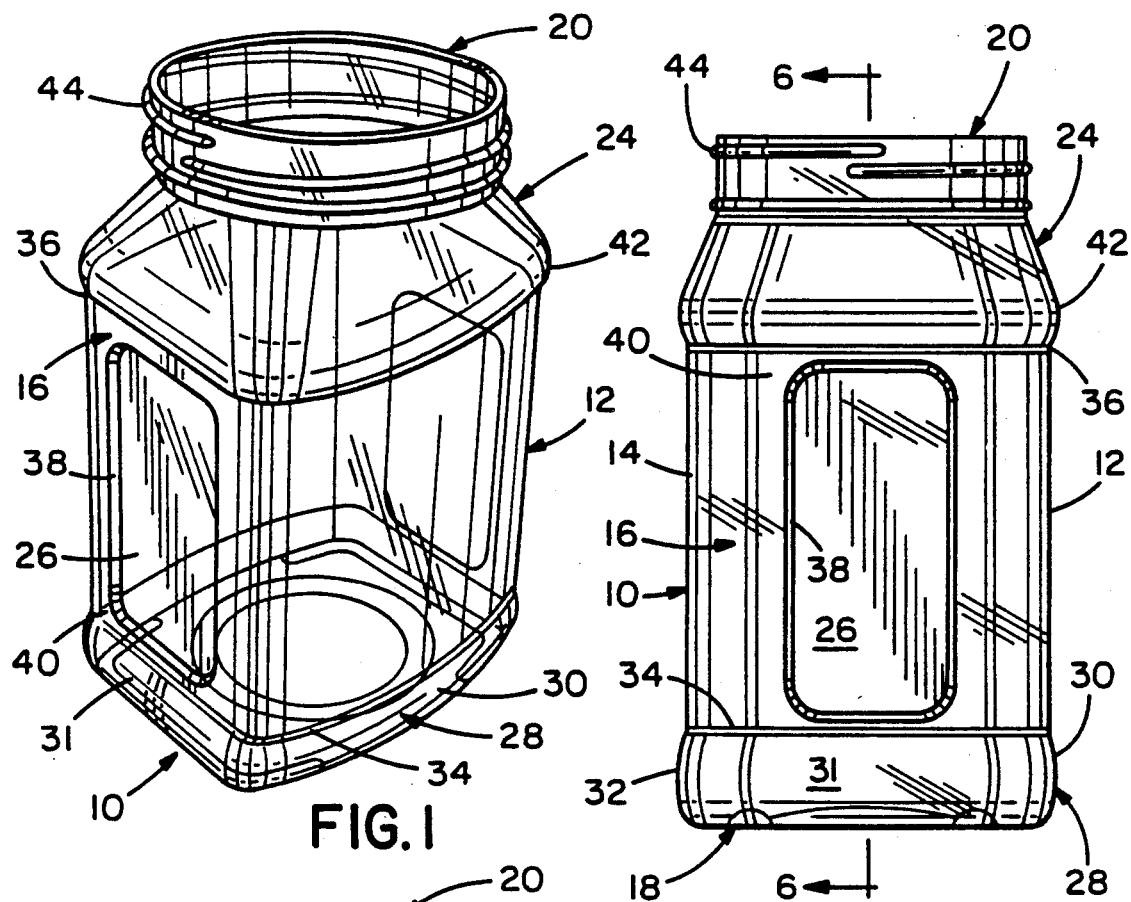
FIG. 1
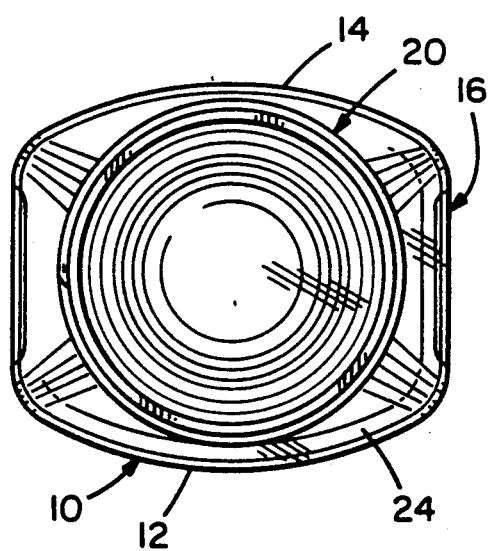
FIG. 2
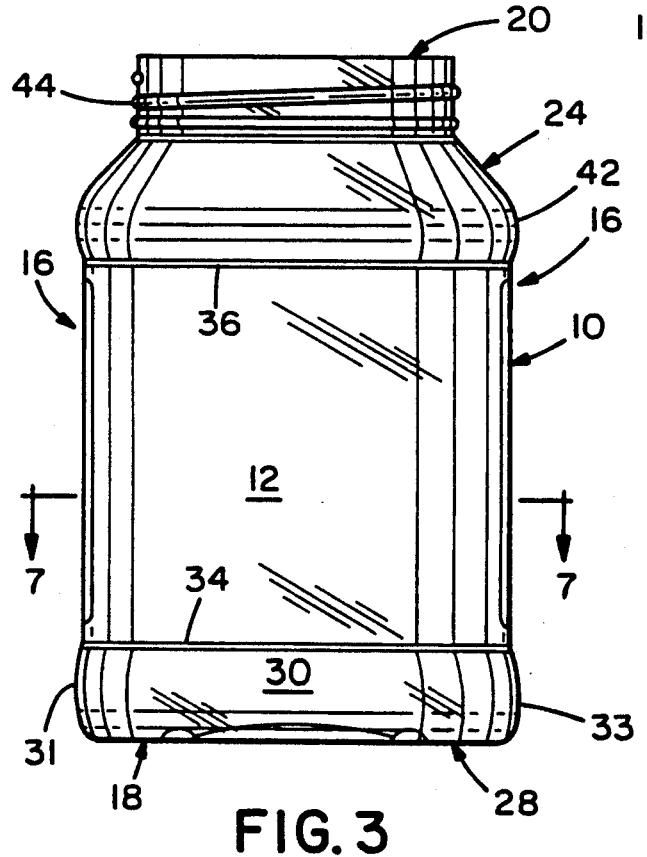
FIG. 3
FIG. 4

PLASTIC JAR

BACKGROUND OF THE INVENTION

The invention relates generally to plastic containers, and more specifically to molded polymeric bottles or jars.

In providing a container for commercial packaging of food products, among the considerations that must be addressed are the ability of the container to receive product in filling operations; the degree of difficulty that will be encountered by the consumer in dispensing product from the container; the ability of the container to withstand various loads, such as stacking loads, during filling, sealing, shipping, display and consumer use; the ability of the container to be packed efficiently among like containers; and the appearance of the container.

Plastic bottles and jars are widely used for food products, and provide lightweight, relatively inexpensive packaging. One disadvantage of many plastic containers is that they are subject to panelling, i.e., localized inward deflections or dents which significantly distort portions of the container. Panelling occurs as a result of pressure in the sealed interior of the container dropping below atmospheric pressure. Such a pressure drop may be caused by cooling of the product after filling or by other factors. Panelling is undesirable not only due to the fact that it may reduce the container's ability to stably withstand compressive vertical loading when upright, but also due to its negative aesthetic impact, making the container appear damaged or deformed and therefore possibly unacceptable to the consumer.

A general object of the invention is the provision of a lightweight, economical plastic jar which is capable of responding to interior pressure reductions without panelling. Further objects and advantages of the invention are set forth below.

SUMMARY OF THE INVENTION

In accordance with the invention, there is provided a lightweight plastic jar having outwardly convex front and back walls, each having a relatively large radius of curvature, and a pair of side walls having relatively large planar portions capable of controlled inward deflection to accommodate decreases in the interior volume of the jar. The curved front and back walls are also capable of slight inward deflection while maintaining their outward convexity.

In accordance with a further feature of the invention, the configuration of the jar, and particularly the shoulder area, facilitate dispensing of product while providing sufficient strength and rigidity. To this end, the shoulder surfaces slope steeply downward from a relatively large mouth to corners which preferably have radii of curvature of at least about 0.5 in.

BRIEF DESCRIPTION OF THE DRAWINGS

FIG. 1 is a perspective view of a jar embodying the invention;

FIG. 2 is a side elevational view of the jar of FIG. 1;

FIG. 3 is a front elevational view of the jar of FIG. 1;

FIG. 4 is plan view of the jar of FIG. 1;

DETAILED DESCRIPTION OF PREFERRED EMBODIMENT

Figure 5:
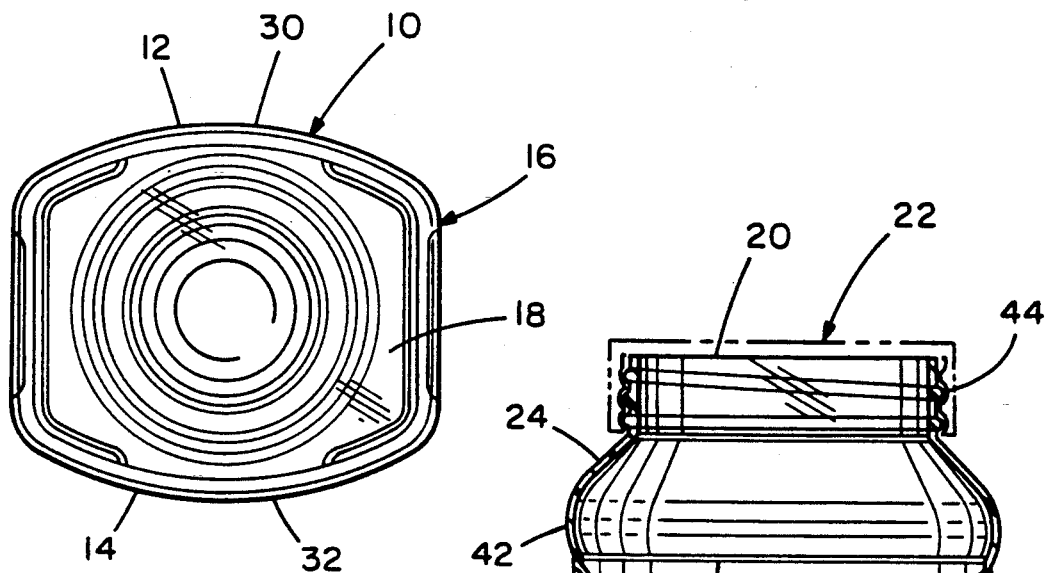
FIG. 5 is a bottom view of the jar of FIG. 1.
Figure 6:
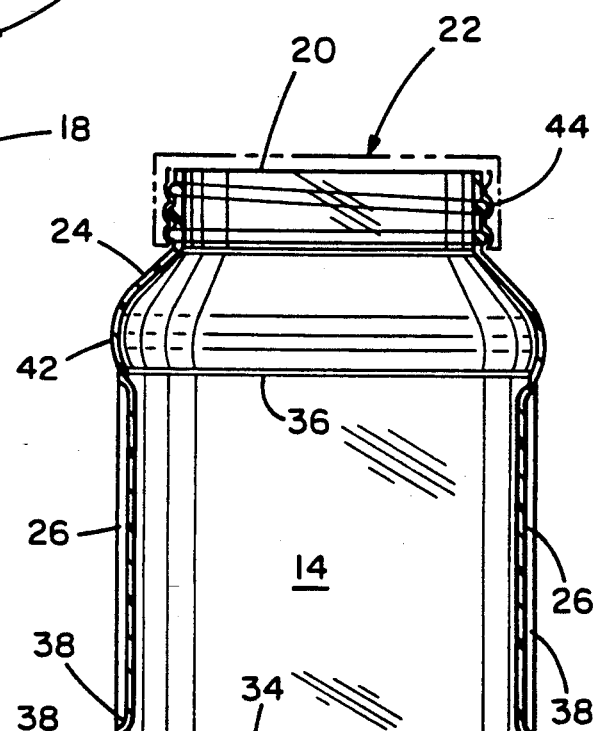
FIG. 6 is a sectional view taken substantially along line 6—6 in FIG. 2.
Figure 7:
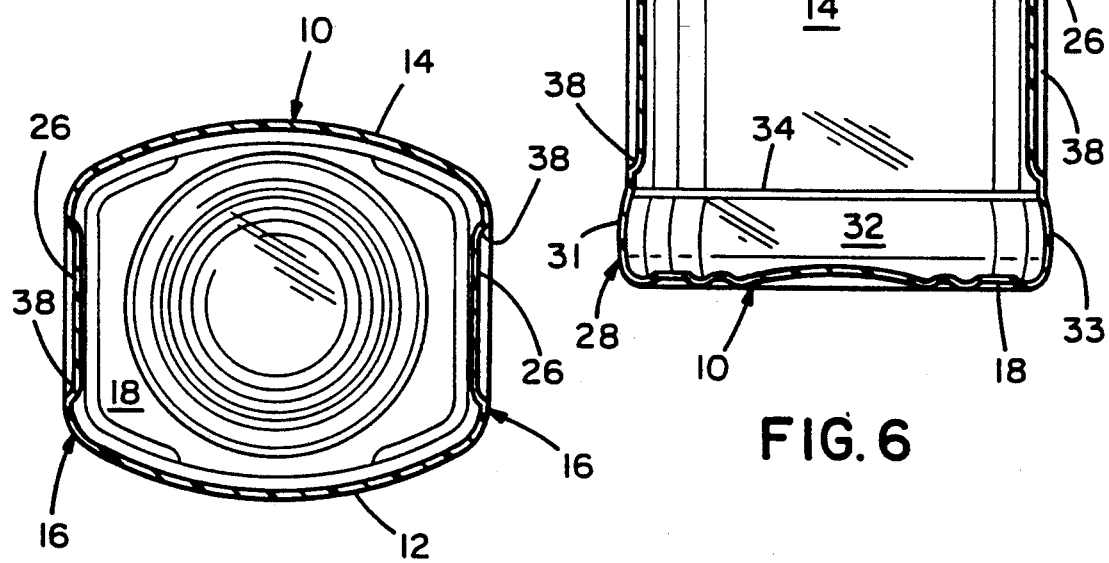
FIG. 7 is a sectional view taken substantially along line 7—7 in FIG. 3.

The invention is generally embodied in a molded polymeric container or jar 10. In the illustrated embodiment, the jar 10 has a generally rectangular configuration as viewed in plan, comprising upstanding, outwardly convex front and back walls 12 and 14, and upstanding side walls 16. The jar has a base 28 which includes a generally horizontal bottom wall 18 and at its upper end has an annular mouth 20 with means thereon for cooperating with a closure 22 to seal the container. A shoulder area 24 slopes downward from the mouth 20 of the container to the upstanding walls.

In accordance with a feature of the invention, to enable the container to decrease in interior volume in response to decreased internal pressure, each of the side walls 16 has an inwardly displaceable portion 26 disposed generally centrally thereof. In the illustrated embodiment, the inwardly displaceable portions are relatively large, substantially planar areas. The remaining surface area of the container is in major part outwardly convex and derives somewhat greater rigidity from its configuration.

The base portion 28 comprises four upstanding wall portions 30, 31, 32 and 33 which are outwardly convex as viewed in elevation (See FIGS. 2 and 3), with a radius of curvature of about 1.5 to 2 in. as viewed in elevation. The wall portions 30 and 32 at the lower ends of the front and rear walls 12 and 14 are also outwardly convex as viewed in plan, having a radius of curvature as viewed in plan corresponding to that of the front and rear walls. The base wall portions 30, 31, 32 and 33 intersect the bottom wall 18 at a smaller radius of curvature. At the intersection of the base 28 and the upstanding walls is an inflection line 34, which extends about the container.

The lower portion 42 of the shoulder area 24 is also outwardly convex as viewed in elevation on all four sides. In accordance with a feature of the invention, to facilitate dispensing of product from the jar while providing structural rigidity, the lower portion of the shoulder area has a radius of curvature of about 0.75 to 1 in. as viewed in elevation, and is also outwardly convex as viewed in plan along its forward and rear surfaces with curvature corresponding to that of the front and back walls 12 and 14. An inflection line 36 extends along the intersection of the shoulder area 24 with the upstanding walls 12, 14 and 16.

Each of the inwardly displaceable, substantially planar portions 26 is slightly recessed and surrounded by an integral frame 38 which is itself surrounded by a peripheral area 40 of the side wall 16. The displaceable portions 26 are generally rectangular with rounded corners, and have sufficient area that slight inward deflection is sufficient to accommodate normal interior volume changes and avoid panelling. Due to the location and configuration of these portions, normal inward deflection or distortion thereof does not significantly detract from the strength or the appearance of the container 10. A pressure differential across the side wall 16 due to a pressure drop in the interior of the jar 10 deflects the side wall 16 inward, with the center of the planar portion 26 undergoing maximum displacement, and the peripheral area 40 bending slightly inward as well.

The provision of the aforedescribed structure enables the container 10 to accommodate decreased interior pressure without inward buckling or panelling of the front and back walls 12 and 14. It may be noted that the range of motion of the side walls is necessarily limited in the illustrated embodiment, and that in the event of a very large decrease in interior volume, buckling of one or both of the front and back walls may be unavoidable. However, the side walls can be configured to accommodate volume changes occurring under normal conditions for particular products. The illustrated jar is intended to be used as a container for 48 oz. quantities of mayonnaise, packaged for consumer sale.

The upper portion of the shoulder area slopes downward from the mouth 20 of the jar 10. The slope is somewhat greater at the front and back than at the sides, due to the width of the jar being greater than its depth. All portions of the shoulder area have a slope of at least about 45° and the front and back portions slope at about 65°–70°. The mouth in the illustrated embodiment has an inner diameter of about 3 in. and a height of about 0.75 in. to 1 in., and has an exterior thread 44 for engagement with a corresponding interior thread on a cooperating lid 22. The combination of the relatively wide mouth and sloped shoulders contributes to the facility of product dispensing.

The jar 10 is preferably made of a suitable polymeric material such as polyester, and is preferably transparent. The illustrated jar has a height of about 7 in.; width of about 4.5 in.; and depth of about 4 in. The vertical dimension between the inflection lines 34 and 36 is about 4 in. The planar areas 26 measure about 3.5 in. by 1.5 in., and are indented from the surrounding areas of the respective side wall by about 0.1 in. in their undisplaced positions. Each of the front and back walls is preferably vertical and shaped as a portion of a cylinder, having a radius of curvature of about 4 in. As viewed in plan, the radius of curvature at each of the four corners is about 0.5 in. to 0.75 in.

From the foregoing it should be appreciated that the invention provides an improved container capable of withstanding controlled inward deformation due to interior pressure drops without undesirable panelling. The configuration of the container further provides advantages in facilitating dispensing of products such as mayonnaise. The jar enables relatively efficient use of space in transportation and display, in that it interfits with like jars with relatively little interstitial space as compared with round jars. Also, the illustrated 48 oz. jar fits in standard refrigerator door shelves which will not accommodate 48 oz. round jars presently in use. The jar further compares favorably with conventional glass jars with respect to impact resistance.

The invention is not limited to the embodiment described above or to any particular embodiment, but is pointed out by the following claims.

What is claimed is:

1. A sealable plastic jar comprising:
   upstanding, outwardly convex front and back walls constructed to be capable of slight inward deflection while maintaining their outward convexity;
   a pair of upstanding side walls having relatively flexible, substantially planar portions constructed to be capable of inward deflection to accommodate reduction of the interior volume of said jar while avoiding panelling of the side walls;
   a generally horizontal bottom wall contiguous with lower portions of said front, back and side walls;
   a mouth and removable closure disposed at the upper end of the jar, said mouth comprising an annulus having means thereon for cooperation with a closure; and
   a shoulder area that slopes downwardly about said mouth to said front, back and side walls;
   said relatively flexible portions of said side walls being slightly recessed from surrounding portions of said side walls.

2. A plastic jar in accordance with claim 1 wherein said jar has a height of about 7 in., width of about 4.5 in., and depth of about 4 in., and wherein each of said front and back walls defines a part-cylindrical surface having a radius of curvature of about 4 in.

3. A plastic jar in accordance with claim 1 wherein said shoulder area joins said front, back and side walls at rounded corners, each having a minimum radius of curvature of about 0.5 in.

4. A plastic jar in accordance with claim 1 wherein every portion of said shoulder area has a slope of at least about 45° in. and said mouth has a diameter of about 3 in.

5. A plastic jar about 7 in. in height with a width of about 4.5 in. and depth of about 4 in., comprising:
   upstanding front and back walls having generally uniform thickness and defining convexly curved exterior surfaces and correspondingly concavely curved interior surfaces;
   a pair of upstanding side walls;
   a generally horizontal bottom wall contiguous with lower portions of said front, back and side walls;
   a mouth and removable closure disposed at the upper end of the jar, said mouth comprising an annulus having means thereon for cooperation with said closure to hermetically seal said jar;
   a shoulder area that slopes downwardly about said mouth to said front, back and side walls;
   each of said front and back walls defining a part-cylindrical surface having a radius of curvature of about 4 in.;
   said shoulder area adjoining said front, back and side walls at rounded, concave corner surfaces, each of said corner surfaces having a radius of curvature of at least 0.5 in.;
   every portion of said shoulder area having a minimum slope of about 45°.

6. A plastic jar in accordance with claim 5 wherein said side walls each have substantially planar portions capable of inward deflection to accommodate reduction of the interior volume of said jar.

7. A plastic jar in accordance with claim 6 wherein said substantially planar portions of said side walls are slightly recessed from surrounding portions of said side walls.

8. A plastic jar in accordnce with claim 5 having a mouth diameter of about 3 in.

* * * * *